(12) United States Patent
Tagami

(10) Patent No.: US 6,200,720 B1
(45) Date of Patent: *Mar. 13, 2001

(54) GRAFT RESIN, PROCESS FOR THE PRODUCTION THEREOF AND USE THEREOF

(75) Inventor: Toshio Tagami, Shizuoka (JP)

(73) Assignee: Tomoegawa Paper Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,551

(22) Filed: Jun. 8, 1999

Related U.S. Application Data

(63) Continuation-in-part of application No. 08/972,721, filed on Nov. 18, 1997, now abandoned.

(30) Foreign Application Priority Data

Nov. 22, 1996 (JP) .................................................. 8-327652
May 30, 1997 (JP) .................................................. 9-156130

(51) Int. Cl.[7] ............................ G03G 9/087; C08F 8/14; C08F 8/28; C08L 29/00
(52) U.S. Cl. .......................... 430/111; 430/110; 430/135; 430/137; 430/633; 525/61; 525/58; 525/69; 524/503; 524/504; 524/537; 524/557; 524/558; 526/202
(58) Field of Search ................................. 525/61, 58, 69; 524/503, 504, 537, 557, 558; 526/202; 430/110, 111, 135, 137, 964, 633

(56) References Cited

U.S. PATENT DOCUMENTS

| 3,560,464 |   | 2/1971 | Toyoshima et al. . |        |
|-----------|---|--------|--------------------|--------|
| 4,772,663 | * | 9/1988 | Marten et al.      | 525/60 |
| 4,915,974 |   | 4/1990 | D'Amelia et al. .  |        |
| 5,795,694 | * | 8/1998 | Uchiyama et al.    | 430/110 |

* cited by examiner

Primary Examiner—James J. Seidleck
Assistant Examiner—Olga Asinovsky
(74) Attorney, Agent, or Firm—Wenderoth, Lind & Ponack, L.L.P.

(57) ABSTRACT

A graft resin having a structure of the formula (1) and having a number average molecular weight of 2,000 to 50,000,

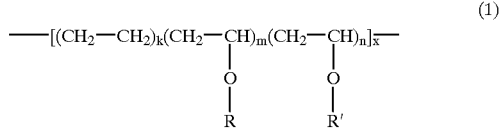

has excellent low-temperature moldability and exhibits an excellent shelf life against softening when stored at high temperatures, and an electrostatic charge developing toner containing the above graft resin as a binder exhibits excellent low-temperature fixing properties, developability and transferability without impairing the shelf life.

5 Claims, No Drawings

GRAFT RESIN, PROCESS FOR THE PRODUCTION THEREOF AND USE THEREOF

This application is a continuation-in-part of now abandoned application, Ser. No. 08/972,721, filed Nov. 18, 1997.

FIELD OF THE INVENTION

The present invention relates to a graft resin having a novel structure, a process for the production thereof and use thereof. More specifically, it relates to a graft resin having low-temperature moldability, a process for the production thereof and an electrostatic charge developing toner excellent in low-temperature fixing properties and developing properties.

PRIOR ART

Polymer alcohols typified by polyvinyl alcohol (called "PVA" for short hereinafter) are highly useful materials which have been and are widely used in industry. PVA having a highly reactive alcoholic hydroxyl group is widely used as a raw material for a formal resin and a butylal resin. Further, polyvinyl acetate as a precursor of PVA plays an important role in the fields of coating compositions and adhesives. In hydrous gel compositions containing PVA, further, there has been proposed a method in which PVA is dissolved in a highly polar solvent such as water or dimethylsulfoxide and a water-soluble monomer is grafted in a radical polymerization manner (J. Polym. Sci. Polym. Chem. Ed., 12, 1829 (1974) or a method in which a functional separation membrane is formed by grafting (Journal of Japan Chemical Society, 1995 (11)).

PVA is grade-classified with regard to polymerization degree, purity and saponification degree. Further, a variety of modified polyvinyl alcohols having thermal characteristics meeting with requirements, obtained by adjusting the saponification degree of polyvinyl acetate as a precursor, are commercially available, and used depending upon required characteristics. Many manufactures produce these modified polyvinyl alcohols, which are commercially available in the general name of "POVAL".

Polyethylene vinyl alcohol, which has a similar structure to PVA, having lower crystallinity based on hydrogen bond than PVA, is easily melted by heating and easily molded. It is therefore used as a material for producing food packaging materials by film forming or injection molding. Polyethylene vinyl acetate which is a precursor of polyethylene vinyl alcohol is also applied to a modifier for polyvinyl chloride or an additive for special waxes.

However, the above PVA and polyethylene vinyl alcohol according to prior art techniques have very high melt initiation temperatures and therefore have a problem that they cannot be shaped or molded at a low temperature.

For decreasing the melt initiation temperature of PVA, it is required to decrease the saponification degree and decrease the polymerization degree to 200 or less. It is also required to decrease the polymerization degree of polyethylene vinyl alcohol as well. In this case, however, the heat absorption peak temperature measured with a differential scanning calorimeter (called "DSC" for short hereinafter) decreases, and there arises a shelf life problem that polymers are softened when stored at high temperatures such as high temperatures of summer seasons, etc. As other method, a monomer similar to vinyl acetate may be introduced as a comonomer. In this method, however, a vinyl acetate monomer and a long-chain fatty acid are converted to a vinyl ester monomer by an ester exchange reacttion in an organic solvent in the presence of a catalyst and then the copolymerization reaction is carried out. The production process is therefore complicated, and a less expensive end product is difficult to produce.

Further, it is known that for improving a polymer in shelf life while maintaining its melt initiation temperature at a decreased temperature, a vinyl ester monomer having an aromatic ring introduced into its main chain or a vinyl ester monomer having a tert-butyl group is used to increase the heat absorption peak temperature. However, the former aromatic vinyl ester monomer is liable to cause a side reaction based on a radical reaction, and the intended copolymerization is difficult to carry out. A bulk polymerization of the aromatic vinyl ester monomer is therefore carried out, while it is difficult to control the bulk polymerization so as to obtain the intended thermal characteristics. The latter permits the intended copolymerization, while it has the above problem of cost, and it is difficult to increase the amount ratio of the monomer. It is therefore difficult to improve the polymer in the low-temperature moldability while maintaining the excellent shelf life of the polymer.

Meanwhile, in an electrophotographic method, an electrostaic recording method and an electrostaic printing method, an image of electrostaic charge formed on a substrate (recording layer) is visualized with toner particles composed of a binder resin and a colorant as main components. The so-visualized image is fixed directly to the substrate, or it is transferred to a receptor such as a paper sheet and then fixed. Therefore, not only a toner for electrostatic charge development is naturally required to have excellent developing properties, but also it is required to have excellent transfer properties and excellent fixing properties. In recent years, further, copying machines and printers to which an electrophotographic method is applied are widely spreading and are beginning to be used as family use. Further, these machines and printers are being functionally multiplied, and it is therefore demanded to accomplish low-energy fixing for decreasing the consumption power and simplifying the fixing mechanism.

Recent copying machines and printers use a contact heating method using a heat roll. This method is advantageous in that it has a high heat efficiency so that the power for a fixing portion can be decreased and that the fixing portion can be decreased in size, as compared with a conventional method. As a binder resin for a toner used in this method, there are known a vinyl-like resin having a broad molecular weight distribution and a polyester resin having a crosslinked structure obtained by using a trihydric or higher alcohol or acid component as part of monomers, for preventing an offset phenomenon. An electrophotographic toner is prepared by adding a colorant, a lubricant (a releasing agent), a charge controller, etc., to the above binder resin. Generally, those resins which satisfy the shelf life requirement have a melt initiation temperature, measured with a "Koka" type flow tester (supplied by Simadzu Corporation), of 120° C. or higher, and they are not at all suitable for satisfying the low-energy fixing demand.

Further, in addition to the above binder resin, a graft resin and a block copolymer resin have been proposed. For example, JP-A-54-63831 discloses a developer containing a graft product of oxidized starches. JP-A-56-15740 discloses a toner containing a resin obtained by graft-polymerizing or copolymerizing 1 to 30 parts by weight of a vinyl compound and 100 parts by weight of a vinyl acetate monomer in the presence of crystalline polyethylene and polypropylene. JP-A-63-27855, JP-A-64-35456 and JP-A-2-93658 disclose a toner containing a resin obtained by graft-polymerizing or blocck-copolymerizing a crystalline polyester resin and an ion-crosslinked amorphous vinyl polymer having an Mw/Mn of at least 3.5. JP-A-2-108066 and JP-A-2-108067 disclose an electrophotographic toner containing a graft copolymer obtained from a fluorine-containing monomer. JP-A-3-122660 discloses a heat-fixing toner containing a polyolefin obtained by graft-modifying an α,β-unsaturated polyolefin with an aromatic vinyl monomer, an unsaturated fatty acid or an unsaturated fatty acid ester. JP-A-3-9370 discloses a resin for a toner, obtained by grafting a crystalline polyester resin and an amorphous vinyl polymer having an Mw/Mn of at least 3.5 by a mechanochemical reaction. JP-A-4-274247 discloses a heat-fixing toner containing a polyethylene which is graft-modified with a styrene derivative or unsaturated fatty acid and has a number average molecular weight of 1,500 or less and an Mw/Mn of 4.0 or less and a polypropylene having a low molecular weight. However, all of the above prior art documents use a graft resin and other resin in combination, and do not use a graft resin alone as a binder resin.

Further, the above resins are not fully satisfactory for copying with demands for a decrease in consumption power and low-energy fixing.

Attempts have been therefore made to decrease the glass transition temperature of a binder resin for decreasing the fixing temperature. In these attempts, however, the fixing temperature cannot be decreased with satisfying the shelf life of a toner. As a result, there has been studied a surface modification method in which toner particles are surface-coated with inorganic fine particles or an encapsulation method in which toner particles are coated with a polymerizable substance having a high glass transition temperature.

Further, the low-temperature fixing of a toner can be attained to some extent by incorporating a crystalline material having a low molecular weight such as a carnauba wax, a Fischer Tropsch wax, a synthetic ester wax or a montan wax, while this method has a problem that the fluidity of the toner decreases so that the amount of the above crystalline material is limited. The toner is therefore not sufficient in low-temperature fixing properties.

Further, studies are being made for decreasing the fixing temperature of a resin composition for a toner by grafting an unsaturated compound to a polyolefin. However, this method involves a problem that side reactions take place in which a main chain is broken with initial radicals and grown radicals generated during the reaction, and the intended grafting does not adequately proceed, so that a resin having a high graft ratio cannot be easily obtained.

U.S. Pat. Nos. 3,560,464, 4,915,974, etc, disclose a modified polyvinyl alcohol such as a polyvinyl alcohol fatty acid ester. Generally, polyvinyl alcohol resins have a hydrophilic hydroxyl group. On this account, polyvinyl alcohol resins are susceptible to humidity. For example, when humidity is high, the static electrification properties that are necessary as a toner for electrostatic charge development are deteriorated. Almost every toner for electrostatic charge development is produced by a melt-kneading method. However, since the melting point and the decomposition temperature of polyvinyl alcohol resins are close to each other, there is a problem on the production thereof. So far, therefore, the polyvinyl alcohol resins has been scarcely taken into account as a resin for toners.

As a result of the various studies, the present inventors have succeeded in providing a novel graft resin which is free from the above problems.

SUMMARY OF THE INVENTION

It is an object of the present invention to provide a novel graft resin which has excellent low-temperature moldability and exhibits an excellent shelf life against softening when stored at high temperatures, and a process for the production thereof.

It is another object of the present invention to provide a toner for electrostatic charge development, which contains a novel graft resin as a binder resin and exhibits excellent low-temperature fixing properties, developability and transferability without impairing the shelf life.

According to the present invention, there is rovided a graft resin having a structure of the formula (1) and having a number average molecular weight of 2,000 to 50,000,

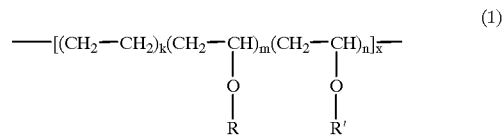

wherein R is a hydrogen atom, a benzoic acid residue or a fatty acid residue having 4 carbon atoms or less, R' is a fatty acid residue having at least 12 carbon atoms, each of k, m and n is a copolymerization ratio, k is 0 to 0.60, each of m and n is greater than 0, the value of n/(m+n) is in the range of from more than 0.30 to 0.85, k+m+n=1.0, and x is an average polymerization degree.

According to the present invention, further, there is provided a process for the production of the above graft resin, which comprises carrying out a condensation reaction of a polymer of the formula (2),

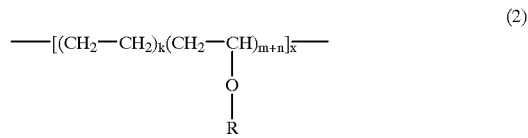

wherein k, m, n, x and R are as defined in the formula (1), and a fatty acid of the formula (3),

wherein R" is an aliphatic residue having at least 11 carbon atoms.

In the above process for the production of the above graft resin, further, when the polymer of the formula (2) is a partial-saponification polyvinyl alcohol, the partial-saponification polyvinyl alcohol has a saponification degree of 80 mol % or less.

According to the present invention, further, there is provided a toner for electrostatic charge development, which contains a binder resin and a colorant as main components, the binder resin containing the above graft resin.

Further, according to the present invention, there is provided a method of use of the above toner for electrostatic charge development, with a copying machine or a printer using a heat-fixing method selected from the group consisting of a heat roll method, a heat belt method and a heat plate method.

DETAILED DESCRIPTION OF THE INVENTION

The present invention will be explained in detail hereinafter.

The novel graft resin of the present invention has a structure of the formula (1), and is required to have an Mn of 2,000 to 50,000. When the Mn is less than 2,000, the resin has a problem of a shelf life. When the Mn is greater than 50,000, there is a problem that the melt-viscosity of the resin is high so that it is difficult to form a uniform graft resin.

In the present invention, the copolymerization ratio of an ethylene portion of the main chain of the graft resin, i.e., k in the formula (1), is required to be 0 to 0.60. When the copolymerization ratio of the ethylene portion is greater than 0.60, the heat absorption peak temperature measured with a DSC sharply decreases. With regard to copolymerization ratios m and n of a vinyl alcohol portion, $n/(m+n)$ is a graft ratio, and it is required to be from more than 0.30 to 0.85, more preferably from 0.40 to 0.85. When the value of $n/(m+n)$ is less than the lower limit of the above range, the melt initiation temperature of the resin is not low, and the difference thereof from the heat absorption peak temperature is not decreased. When the value of $n/(m+n)$ is greater than 0.85, the main chain portion of the graft resin has a high crystallinity, and the melting temperature and the heat decomposition temperature of the resin are therefore close to each other so that it is difficult to produce the graft resin.

In the graft resin of the present invention, the difference between the heat absorption peak temperature measured with a differential scanning calorimeter and the melt initiation temperature measured with a "Koka" type flow tester is preferably at least 50° C. or less, more preferably 40° C. or less, more preferably 30° C. or less, particularly preferably 20° C. or less. When the above temperature difference is more than 50° C., the low-temperature fixing properties are poor. The heat absorption peak temperature is preferably 55 to 100° C., and the melt initiation temperature is preferably 55 to 100° C. as well.

In the process for the production of a graft resin, provided by the present invention, the condensation reaction of a polymer of the formula (2) and a fatty acid of the formula (3) is carried out, and the resultant graft resin has a structure of the formula (1).

The main-chain portion of the graft resin of the present invention, i.e., the polymer of the formula (2), is formed of a partially saponified polyvinyl alcohol, polyethylene vinyl alcohol and a precursor thereof. In this case, the partial saponifcation polyvinyl alcohol, the polyethylene vinyl alcohol and the precursor thereof have an Mn of 2,000 to 50,000. These preferably have a glass transition temperature (called "Tg" for short hereinafter), measured with a DSC, of 40 to 70° C. When the Tg is lower than 40° C., undesirably, the range of the fatty acid of the formula (3) that can be used is limited for satisfying the shelf life of a toner. When it is higher than 70° C., undesirably, a toner is poor in low-temperature fixing properties. Further, the precursor may have a benzoic acid residue or a fatty acid residue having 4 carbon atoms or less as a substituent. The polymerization degree x of the above polymer is 200 to 1,000, and the partially saponified polyvinyl alcohol preferably has a saponification degree of 80 mol % or less, more preferably 70 mol % or elss. When the saponification degree of the partially saponified polyvinyl alcohol is greater than 80 mol %, the melting temperature and the pyrolysis initiation temperature of the partially saponified polyvinyl alcohol are close to each other and the graft resin is therefore liable to be non-uniform.

The main chain of the above polymer may be formed of the partially saponified polyvinyl alcohol alone, and in this case, n=0. The above polymer is commercially available, and can be selected from commercially available products. Specifically, the partially saponified polyvinyl alcohol is commercially available in the trade names of Gosefimer NK-05 and Gosefimer KP-08 (supplied by Nippon Synthetic Chemicals Industry Co., Ltd.) and some others supplied by Denki Kagaku Kogyo K.K (DENkA), the Shin-Etsu Chemical Co., Ltd., Unitika Chemical and Kuraray Co., Ltd. The polyethylene vinyl alcohol is commercially available in the trade name of Soarnol E3803 supplied by Nippon Synthetic Chemicals Industry Co., Ltd., and some others supplied by Kuraray Co., Ltd. These have the above-specified properties.

The fatty acid of the formula (3) used in the present invention includes saturated and unsaturated fatty acids having at least 12 carbon atoms, such as lauric acid, myristic acid, myristoleic acid, palmitic acid, palmitoleic acid, oleic acid, linoleic acid, linolenic acid (including $\alpha$- and $\gamma$-), ricinoleic acid, stearic acid, 12-hydroxystearic acid, arachidic acid, behenic acid, erucic acid, lignoceric acid, beef tallow fatty acid which is a natural mixture of these, beef tallow hardened fatty acid, palm oil fatty acid, palm oil hardened fatty acid, saccharose fatty acid, plant oil fatty acid, fish oil hardened fatty acid, soybean hardened fatty acid, and esterified products and derivatives derived from petroleum such as montanic acid. These fatty acids may be used alone or in combination depending upon physical properties.

Further, long-chain synthetic fatty acids are commercially available in the trade name of Unicid having a molecular weight up to about 800 (supplied by Petrolite) and these may be used.

When an unsaturated fatty acid of the fatty acids of the formula (3) is grafted, a side reaction such as an oxidation reaction or a crosslinking reaction may take place in some cases. The side reaction can be prevented by adding a radical reaction inhibitor or an anti-oxidizing agent, while the addition thereof is possible so long as no adverse effect is caused on the condensation reaction.

The fatty acid of the formula (3) is selected from the above saturated and unsaturated fatty acids, and the fatty acid preferably has a heat absorption peak temperature measured with a DSC, i.e., a melting point of 65 to 120° C.

The process of the present invention can be carried out by any one of a melting method and a solution method. In the process of the present invention, the polymer of the formula (2) and the fatty acid of the formula (3) are subjected to a condensation reaction at 150 to 290° C. under a nitrogen atmosphere, whereby the graft resin of the formula (1) is obtained. The graft resin preferably has a heat absorption peak temperature of 10 to 100° C., more preferably 40 to 70° C.

The process for the production of a graft resin, provided by the present invention, may use a catalyst used in an esterification or an ester-exchange reaction. For example, when the reactive group of the polymer of the formula (2) is a hydroxyl group, i.e., when R in the formula (2) is hydrogen, a known esterifying catalyst can be used. Specifically, the catalyst is preferably selected from lithium acetate, sodium acetate, magnesium acetate, potassium acetate, calcium acetate, nickel acetate, cobalt acetate, balium acetate, manganese acetate and hydrates of these. When the reactive group is a lower ester typified by acetic acid ester, i.e., when R is a fatty acid residue having 1 to 4 carbon atoms or a benzoic acid residue, a known ester exchange catalyst can be used. Specifically, the catalyst is preferably selected from organic tin compounds such as dibutyltin oxide, organic titanium compounds such as titanium tetrapropoxide, zinc acetate and hydrates of these. Of the above catalysts, acetic acid alkali metal salts, acetic acid alkaline earth metal salts and acetic acid transition metal salts are preferred since these are highly reactive. More preferred are sodium acetate, potassium acetate, calcium acetate, magnesium acetate, barium acetate, zinc acetate, nickel acetate, manganese acetate, cobalt acetate and hydrates of these.

In the graft resin obtained by the production process of the present invention, the melting initiation temperature can be controlled on the basis of a graft ratio. When the graft ratio is not more than 30 mol %, the effect on decreasing the melt initiation temperature is low. The graft ratio is required to be at least more than 30 mol %. The graft ratio is preferably at least more than 30 mol %, more preferably at least 40 mol %. The upper limit of the graft ratio is required not to exceed 85 mol % in view of the above production problem, and it is preferably 80 mol % or less.

The toner for electrostatic charge development, provided by the present invention, is formed of particles containing at least the above graft resin and a colorant and optionally containing other additive which is dispersed as required. That is, the toner of the present invention contains a binder resin and a colorant as main components, and 10 to 100% by weight of the binder resin is the above graft resin. The toner has an average particle diameter of 5 to 20 $\mu$m. The toner for electrostatic charge development may be composed by mixing the above-obtained particles and other additive formed of fine particles such as silica.

The colorant includes carbon black, Aniline Blue, chalco oil blue, Chromium Yellow, Ultramrine Blue, du Pont Oil Red, Quinoline Yellow, Methylene Blue Chloride, Phthalocyanine Blue, Malachite Green Oxlate lamp black, Rhodamine B, quinacridone, Rose Bengale and a mixture of at least two of these. It is required to incorporate the colorant in an amount sufficient for forming a visible image having a sufficient density. Generally, the amount of the colorant per 100 parts by weight of the binder resin is approximately 1 to 20 parts by weight.

The above additive which is added as required includes a lubricant, a charge controlling agent, a magnetic agent and an external additive.

The lubricant includes natural waxes such as carnauba wax, candelilla wax and montan wax, synthetic hydrocarbon waxes such as a low-molecular-weight polypropylene, a low-molecular-weight polyethylene and a Fischer-Tropisch wax, and a synthetic ester wax.

The charge controlling agent includes positively chargeable controlling agents such as nigrosine dye, quaternary ammonium salt, a triphenylmethane-containing agent, a resin-containing agent, pyridinium salt and azine, and negatively chargeable controlling agents such as chromium-containing or iron-containing metal complex and a resin-containing agent. Generally, the charge controlling agent is used in an amount of 0.01 to 10 parts by weight per 100 parts by weight of the binder resin.

The magnetic agent includes iron oxide, ferrite and magnetite, and in addition to these, it also includes ferromagnetic materials such as cobalt and nickel and alloys which exhibit ferromagnetism by heat treatment such as Heusler's alloy. As a magnetic agent, a magnetic powder having an average particle diameter of 1 $\mu$m or less is preferred. A magnetic powder imparts a toner with magnetism to form a magnetic toner, and at the same time, has the function of coloring and polishing, and it is used as required. The amount of the magnetic agent greatly differs depending upon a development system, while it is generally incorporated into a toner in an amount of 0.01 to 90% by weight.

The external agent includes inorganic fine particles of silica, titanium oxide or alumina, resin fine particles and magnetic particles. Preferred are fine particles or magnetic particles having an average particle diameter of 1 min or less. More preferred are in organic fine particles having an average particle diameter of 0.1 $\mu$m or less. Further preferred are inorganic fine particles of silica, alumina or titanium oxide each of which particles is surface-treated to have hydrophobic properties. Generally, the external agent is used for improving flowability and a shelf life and obtaining the function of polishing. The amount of the external agent per 100 parts by weight of the toner is 0.01 to 3 parts by weight.

The toner for electrostatic charge development, provided by the present invention, is used as a two-component developer obtained by mixing it with a carrier formed of resin particles containing a magnetic powder, ferrite, granulated magnetite and a magnetic powder or as a one-component developer not mixed with the carrier.

The above carrier generally has an average particle diameter of 30 to 200 $\mu$m, and the carrier may be surface-coated with an acrylic resin, a silicone resin or a fluorine resin. The surface-coated carrier is preferred since the anti-spent properties (durability) are improved.

The toner for electrostatic charge development, provided by the present invention, is preferably used with a heat fixing method using a fixing device having a heat roll, a heat belt or heat plate. The heat roll, the heat belt and the heat plate which contact the toner are preferably those which are surface-treated with a resin having lubricity such as a silicone resin or a fluorine resin. A small amount of a lubricant such as a silicon oil, or the like, may be applied to that surface of the fixing device which is to contact the toner.

In the present invention, the heat absorption initiation temperature, the heat absorption peak temperature and Tg are determined on the basis of a heat absorption curve obtained for the second time when temperature elevation at a rate of 10° C./minute and quenching are repeated twice with a DSC: DSC-120 supplied by Seiko Instruments Inc. Tg is a mid-point value, and it is a mid point between a heat absorption initiation temperature and a heat absorption peak temperature. Further, the melt initiation temperature and the flow softening point are defined as follows. When a "Koka" type flow tester: CFT-500 supplied by Shimadzu Corporation is used, the temperature at which a plunger starts to fall under the following measurement conditions is taken as a melt initiation temperature, and the mid point between the fall initiation temperature and the fall termination temperature is taken as a flow softening temperature.

| Measurement conditions | |
|---|---|
| Plunger | 1 cm$^2$ |
| Die diameter × length | 1 × 1 mm |
| Load | 20 kgf |
| Preliminary heating temperature and time | 50–80° C., 300 seconds |
| Temperature elevation rate | 6° C./minute |

Further, the measurement of a molecular weight is carried out by an osmosis method, and the data of polystyrene is taken as the standard.

The present invention provides a graft resin which can minimize a difference between the heat absoprtion peak temperature and the melt initiation temperature by controlling the graft ratio, which is excellent in low-temperature moldability, which is excellent in a shelf life or resistance to softening at high temperatures and which is useful as a resin modifier, and a process for the production thereof.

Further, the present invention provides a toner for electrostatic charge development, which contains the above graft resin as a binder and which is therefore excellent in low-temperature fixing properties without impairing the shelf life and is excellent in developability and transferability.

The present invention will be explained more in detail with reference to Examples hereinafter.

EXAMPLE 1

Synthesis of Graft Resin From Partially Saponified Polyvinyl Alcohol and Stearic Acid (graft ratio 60 mol %)

56.66 Grams of a partially saponified polyvinyl alcohol (trade name: Gosefimer NK-05, supplied by Nippon Synthetic Chemical Industry Co., Ltd., polymerization degree 500, saponification degree 70 mol %, Tg 61° C.), 227.59 g of stearic acid (heat absorption peak temperature 65° C.) and 2.20 g of zinc acetate hydrate were placed in a 500-ml round-bottom flask, and the contents were temperature-increased to 150° C. to melt them. Then, the contents were temperature-increased by 20° C. and this temperature was maintained for 1 hour to carry out a condensation reaction. The reaction was continued at 270° C. until predetermined amounts of water and acetic acid were no longer generated. Then, the reactor was allowed to cool to 220° C., and the resultant melt was taken out. The so-obtained graft resin of the present invention had a heat absorption initiation temperature of 37.6° C., a heat absorption peak temperature of 41.8° C., a melt initiation temperature of 59.7° C. and a flow softening point of 70.8° C. The difference between the melt initiation temperature and the heat absorption peak temperature was 17.9° C. The graft resin had an Mn of 32,500 and a graft ratio of 60 mol %.

EXAMPLE 2

Synthesis of Graft Resin From Polyethylene Vinyl Alcohol and Behenic Acid (graft ratio 40 mol %)

A graft resin of the present invention was obtained in the same manner as in Example 1 except that the partially saponified polyvinyl alcohol was replaced with 18.98 g of polyethylene vinyl alcohol (trade name: Soarnol E3803, supplied by Nippon Synthetic Chemistry Industry Co., Ltd., Tg 58° C.), that the stearic acid was replaced with 42.35 g of behenic acid (heat absorption peak temperature 77° C.) and that the zinc acetate hydrate was replaced with 0.80 g of calcium acetate. The so-obtained graft resin had a heat absorption initiation temperature of 53.2° C., a heat absorption peak temperature of 60.2° C., a melt initiation temperature of 71.4° C. and a flow softening point of 89.2° C. The difference between the melt initiation temperature and the heat absorption peak temperature was 11.2° C. The graft resin had an Mn of 34,300 and a graft ratio of 40 mol %.

EXAMPLE 3

Synthesis of Graft Resin From Polyethylene Vinyl Alcohol and Stearic Acid (graft ratio 80 mol %)

A graft resin of the present invention was obtained in the same manner as in Example 1 except that the partially saponified polyvinyl alcohol was replaced with 37.97 g of polyethylene vinyl alcohol (trade name: Soarnol E3803, supplied by Nippon Synthetic Chemical Industry Co., Ltd.), that the zinc acetate hydrate was replaced with 2.80 g of sodium acetate hydrate and that the amount of stearic acid was changed from 227.59 g to 141.10 g. The so-obtained graft resin had a heat absorption initiation temperature of 39.2° C., a heat absorption peak temperature of 43.5° C., a melt initiation temperature of 44.5° C. and a flow softening point of 59.7° C. The difference between the melt initiation temperature and the heat absorption peak temperature was 1.0° C. The graft resin had an Mn of 47,800 and a graft ratio of 80 mol %.

EXAMPLE 4

Synthesis of Graft Resin From Partially Saponified Polyvinyl Alcohol and Stearic Acid (graft ratio 80 mol %)

A graft resin of the present invention was obtained in the same manner as in Example 1 except that the partially saponified polyvinyl alcohol (Gosefimer NK-05) was replaced with 56.66 g of a partially saponified polyvinyl alcohol (trade name: Gosefimer NK-08, supplied by Nippon Synthetic Chemical Industry Co., Ltd., polymerization degree 800, Tg 60° C.). The so-obtained graft resin had a heat absorption initiation temperature of 46.6° C., a heat absorption peak temperature of 47.3° C., a melt initiation temperature of 64.5° C. and a flow softening point of 78.3° C. The difference between the melt initiation temperature and the heat absorption peak temperature was 17.2° C. The graft resin had an Mn of 45,600 and a graft ratio of 80 mol %.

EXAMPLE 5

Synthesis of Graft Resin From Polyethylene Vinyl Alcohol and Behenic Acid (graft ratio 80 mol %)

A graft resin of the present invention was obtained in the same manner as in Example 1 except that the partially saponified polyvinyl alcohol was replaced with 18.98 g of polyethylene vinyl alcohol (trade name: Soarnol E3803, supplied by Nippon Synthetic Chemical Industry Co., Ltd.), that the stearic acid was replaced with 81.42 g of behenic acid, and that the zinc acetate hydrate was replaced with 1.62 g of calcium acetate. The so-obtained graft resin had a heat absorption initiation temperature of 53.7° C., a heat absorption peak temperature of 58.6° C., a melt initiation temperature of 58.6° C. and a flow softening point of 74.0° C. The difference between the melt initiation temperature and the heat absorption peak temperature was 0° C. The graft resin had an Mn of 47,800 and a graft ratio of 80 mol %.

EXAMPLE 6

Synthesis of Graft Resin From Polyethylene Vinyl Alcohol and Behenic Acid (graft ratio 60 mol %)

A graft resin of the present invention was obtained in the same manner as in Example 1 except that the partially saponified polyvinyl alcohol was replaced with 18.98 g of polyethylene vinyl alcohol (trade name: Soarnol E3803, supplied by Nippon Synthetic Chemical Industry Co., Ltd.), that the stearic acid was replaced with 63.34 g of behenic acid, and that the zinc acetate hydrate was replaced with 1.26 g of calcium acetate. The so-obtained graft resin had a heat absorption initiation temperature of 53.1° C., a heat absorption peak temperature of 60.6° C., a melt initiation temperature of 63.0° C. and a flow softening point of 79.44° C. The difference between the melt initiation temperature and the heat absorption peak temperature was 2.4° C. The graft resin had an Mn of 44,200 and a graft ratio of 60 mol %.

EXAMPLE 7

Synthesis of Graft Resin From Partially Saponified Polyvinyl Alcohol and Palmitoleic Acid (unsaturated fatty acid) (graft ratio 80 mol %)

A graft resin of the present invention was obtained in the same manner as in Example 1 except that the stearic acid was replaced with 227.59 g of palmitoleic acid which was an unsaturated fatty acid and that 0.1 g of hydroquinone as a polymerization inhibitor was additionally used. The so-obtained graft resin had a heat absorption initiation temperature of 16.6° C., a heat absorption peak temperature of 18.3° C., a melt initiation temperature of 34.5° C. and a flow softening point of 47.3° C. The difference between the melt initiation temperature and the heat absorption peak temperature was 16.2° C. The graft resin had an Mn of 41,100 and a graft ratio of 80 mol %.

EXAMPLE 8

Synthesis of Graft Resin From Polyethylene Vinyl Alcohol and Behenic Acid (graft ratio 80 mol %)

A graft resin of the present invention was obtained in the same manner as in Example 1 except that the partially saponified polyvinyl alcohol was replaced with 18.98 g of polyethylene vinyl alcohol (trade name: Soarnol E3803, supplied by Nippon Synthetic Chemistry Industry Co., Ltd.), that the stearic acid was replaced with 81.74 g of behenic acid and that the amount of zinc acetate hydrate was changed from 0.80 g to 1.60 g. The so-obtained graft resin had a heat absorption initiation temperature of 53.7° C., a heat absorption peak temperature of 58.6° C., a melt initiation temperature of 58.6° C. and a flow softening point of 74.6° C. The difference between the melt initiation temperature and the heat absorption peak temperature was 0° C. The graft resin had an Mn of 44,200 and a graft ratio of 80 mol %.

Toners for electrostatic charge development according to the present invention were prepared using the graft resins obtained in Examples 1 to 6 in the following amount ratios by the following procedures.

EXAMPLE 9

Graft resin obtained in Example 1 100 parts by weight.

Carbon black (trade name: MA-100, supplied by Mitsubishi Chemical Co., Ltd.) 5 parts by weight.

Nigrosine dye (trade name: Bontron No.4, supplied by Orient Chemical Industries, Ltd.) 2 parts by weight.

The above components were mixed with a Henschel mixer (supplied by Mitsui Miike Industries). The mixture was melt-kneaded in a twin-screw kneading machine at a temperature of 100° C., and then, the kneaded mixture was jet-pulverized and air-classified to obtain toner particles having an average particle diameter of 8.5 μm. 100 Parts by weight of the toner particles and 0.3 part by weight of hydrophobic silica (trade name; Cabosil TS-530, supplied by Cabbot Co. were mixed with a Henschel mixer to give a toner for electrostatic charge development.

EXAMPLES 10 TO 14

Toners for electrostatic charge development in Examples 10 to 14 were obtained in the same manner as in Example 9 except that the graft resin obtained in Example 1 was replaced with the graft resins obtained in Examples 2 to 6.

COMPARATIVE EXAMPLE 1

A comparative toner for electrostatic charge development was obtained in the same manner as in Example 9 except that the graft resin was replaced with a commercially available non-crosslinked polyester resin (trade name: D-001, supplied by Nippon Carbide Kogyo).

COMPATATIVE EXAMPLE 2

A comparative toner for electrostatic charge development was obtained in the same manner as in Example 9 except that the graft resin was replaced with a styrene/acrylate resin (styrene/butyl acrylate, copolymerization ratio=65/35, Mw 250,000, Mn 8,000).

A two-component developer was prepared by mixing 5 parts by weight of one of the toners obtained in Examples 9 to 14 and Comparative Examples 1 and 2, with 95 parts by weight of a ferrite carrier (FL-1020, supplied by Powder Tech).

The toners obtained in Examples 9 to 14 and Comparative Examples 1 and 2 were measured for thermal properties with a DSC and a "Koka" type flow tester. Table 1 shows the results.

TABLE 1

| | Heat absorption initiation temperature (° C.) | Heat absorption peak temperature (° C.) : A | Melt initiation temperature (° C.) : B | Flow softening point (° C.) | B-A (° C.) |
|---|---|---|---|---|---|
| Ex. 9 | 37.3 | 41.1 | 59.2 | 70.6 | 18.1 |
| Ex. 10 | 53.0 | 59.8 | 70.8 | 88.4 | 11.0 |
| Ex. 11 | 39.1 | 43.2 | 44.3 | 59.2 | 1.1 |
| Ex. 12 | 46.4 | 47.0 | 64.0 | 77.6 | 17.0 |
| Ex. 13 | 53.3 | 58.0 | 58.0 | 73.8 | 0 |
| Ex. 14 | 52.7 | 60.4 | 62.5 | 78.7 | 2.1 |
| CEx. 1 | Unclear | 66.5 | 90.0 | 105.0 | 23.5 |
| CEx. 2 | 38.5 | 44.5 | 84.7 | 105.2 | 40.2 |

Ex. = Example, CEx. = Comparative Example

Evaluation of Low-temperature Fixing Properties

A non-fixed image of each of the above two-component developers was formed on a plurality of transfer sheets (A4 size) with a commercially available copying machine (trade name: ED-1210, supplied by Toshiba Corp.).

Then, with a copying machine (CLC-200 supplied by Canon Inc.) of which the fixing device of heat roll type (upper and lower rolls of a silicone resin, a silicone oil application type) was modified so as to set a roller temperature and a paper feed rate as required, the above non-fixed image was fixed at a paper feed rate of 200 mm/second at various temperatures by changing the roller temperature stepwise.

The fixed images were measured for image densities with a reflection densitometer RD-914 supplied by Macbeth. Then, an eraser of rubber was rubbed against the fixed images (load 1 kg, three times of back and forth movement), and the rubbed images were measured for image densities. A fixing strength was calculated on the basis of the following equation, and used as an index for low-energy fixing. Table 2 shows the fixing strengths.

Fixing strength (%)=(image density after rubbing/image density before rubbing)×100

Evaluation of Shelf Life 20 grams of each of the toners obtained in Examples 9 to 14 and Comparative Examples 1 and 2 was placed in a bottle of polyethylene and stored at 45° C. for 7 days. The toner was allowed to cool, then taken out of the bottle, and visually observed for a degree of agglomeration. An agglomerate which was easily manually loosened and was free of a problem in practical use was taken as good ("○"), and an agglomerate which feld manually hard was taken as poor ("X").

TABLE 2

(Fixing strength)

| | Fixing roller temperature (° C.) | | | | | | Shelf life |
|---|---|---|---|---|---|---|---|
| | 80 | 100 | 120 | 140 | 160 | 200 | |
| Example 9 | 88 | 93 | 93 | 96 | 97 | ≧98 | ○ |
| Example 10 | 87 | 92 | 91 | 95 | 96 | ≧98 | ○ |
| Example 11 | 89 | 92 | 93 | 97 | ≧98 | ≧98 | ○ |
| Example 12 | 88 | 92 | 93 | ≧98 | ≧98 | ≧98 | ○ |
| Example 13 | 90 | 94 | 95 | ≧98 | ≧98 | ≧98 | ○ |
| Example 14 | 89 | 94 | 95 | ≧98 | ≧98 | ≧98 | ○ |
| Comparative Example 1 | Not fixed | Not fixed | Not fixed | 55 | 70 | ≧98 | ○ |
| Comparative Example 2 | Not fixed | Not fixed | 48 | 75 | ≧98 | ≧98 | X |

EXAMPLE 15

Graft resin obtained in Example 2 50 parts by weight.

Magnetic powder (trade name:EP7-500, supplied by Toda Kogyo Co., Ltd.) 48 parts by weight.

Polyethylene wax (trade name: PE-130, supplied by Hoechst) 2 parts by weight.

Chromium-containing metallized dye (trade name: S-34, supplied by Orient Chemicals Industries, Ltd.) 1.5 parts by weight.

A magnetic toner for electrostatic charge development was obtained in the same manner as in Example 9 except that the components were replaced with the above components.

A laser printer using a heat belt fixing method (trade name:laserjet IV L, supplied by Japan Hewlett Packard Ltd.) was used to develop an image with the above toner, and 1,000 sheets were continuously printed to give excellent images. The toner was excellent in development properties and transfer properties.

EXAMPLES 16, COMPARATIVE EXAMPLES 3 AND 4

Graft resins were obtained in the same manner as in Example 2 except that the amounts of behenic acid and calcium acetate were changed as shown in Table 3.

TABLE 3

| (resin) | Ex. 16 | CEx. 3 | CEx. 4 |
|---|---|---|---|
| Polyethylene vinyl alcohol (Soarnol E3803) | 18.98 | 18.98 | 18.98 |
| Behenic acid | 89.73 | 21.11 | 31.67 |
| Calcium acetate | 1.79 | 0.42 | 0.63 |
| Graft ratio (mol %) | 85 | 20 | 30 |

TABLE 3-continued

| (resin) | Ex. 16 | CEx. 3 | CEx. 4 |
|---|---|---|---|
| Molecular weight (Mn) | 48,000 | 18,500 | 27,500 |

Ex. = Example, CEx. = Comparative Example

Toners for electrostatic charge development were obtained in the same manner as in Example 9 except that the graft resin was replaced with the graft resins obtained according to the amount ratios shown in Table 3. These toners for electrostatic charge development were measured for thermal properties. Table 4 shows the results.

TABLE 4

| | Heat absorption initiation temperature (° C.) | Heat absorption peak temperature (° C.) : A | Melt initiation temperature (° C.) : B | Flow softening point (° C.) | B-A (° C.) |
|---|---|---|---|---|---|
| Ex. 16 | 53.0 | 60.6 | 60.7 | 73.8 | 0.1 |
| CEx. 3 | 53.9 | 61.8 | 83.2 | 103.0 | 21.4 |
| CEx. 4 | 53.7 | 61.2 | 77.1 | 97.8 | 15.9 |

Ex. = Example, CEx. = Comparative Example

A two-component developer was prepared by mixing 5 parts by weight of one of the toners obtained in Example 16 and Comparative Examples 3 and 4, with 95 parts by weight of a ferrite carrier (FL-1020, supplied by Powder Tech). The two-component developer was evaluated for low-temperature fixing properties and shelf life. Table 5 shows the results.

TABLE 5

(Fixing strength)

| | Fixing roller temperature (° C.) | | | | | | Shelf life |
|---|---|---|---|---|---|---|---|
| | 80 | 100 | 120 | 140 | 160 | 200 | |
| Example 16 | 90 | 94 | 95 | ≧98 | ≧98 | ≧98 | ○ |
| Comparative Example 3 | Not fixed | Not fixed | Not fixed | 50 | 72 | ≧98 | ○ |
| Comparative Example 4 | Not fixed | Not fixed | 54 | 75 | 80 | ≧98 | ○ |

What is claimed is:

1. A toner for electrostatic charge development, which contains a binder resin and a colorant, the binder resin containing a graft resin having a structure of the formula (1) and having a number average molecular weight of 2,000 to 50,000,

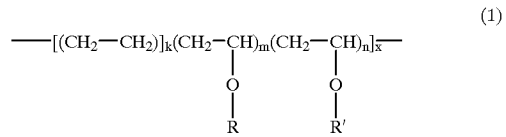

(1)

wherein R is a hydrogen atom, a benzoic acid residue or a fatty acid residue having 4 carbon atoms or less, R' is a fatty acid residue having at least 12 carbon atoms, each of k, m and n is a copolymerization ratio, k is 0 to 0.60, each of m and n is greater than 0, the value of n/(m+n) is in the range of from more than 0.30 to 0.85, k+m+n=1.0, and x is an average polymerization degree.

2. The toner according to claim 1, wherein the graft resin is a produce obtained by a condensation reaction of a polymer having the formula (2):

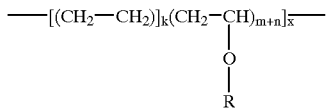  (2)

wherein k, m, n, x and R are as defined in the formula (1), and having a glass transition temperature, measured with a differential scanning calorimeter, of 40 to 70° C. and a fatty acid having the formula (3):

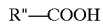  (3)

wherein R" is an aliphatic residue having at least 11 carbon atoms, and having a heat absorption peak temperature, measured with a differential scanning calorimeter, of 65 to 120° C.

3. The toner according to claim 1, wherein the graft resin has a temperature difference of 50° C. or less between a heat absorption peak temperature measured with a differential scanning calorimeter and a melt initiation temperature measured with a "Koka" type flow tester when the graft resin is measured.

4. The toner according to claim 1, wherein at least 10% of the binder resin is the graft resin.

5. A method of use of the toner recited in claim 1 with a copying machine or a printer using a heat fixing method selected from the group consisting of a heat roll method, a heat belt fixing method and a heat plate fixing method.

* * * * *